Dec. 10, 1940.  R. MALCOM  2,224,793
OPHTHALMIC DEVICE
Filed June 26, 1937
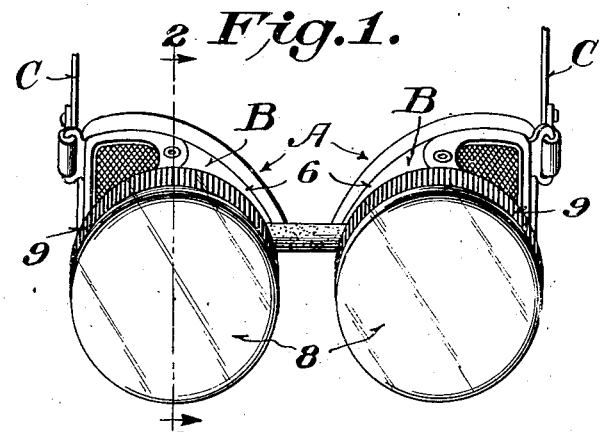
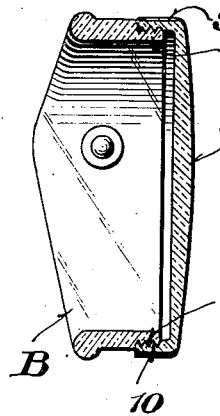
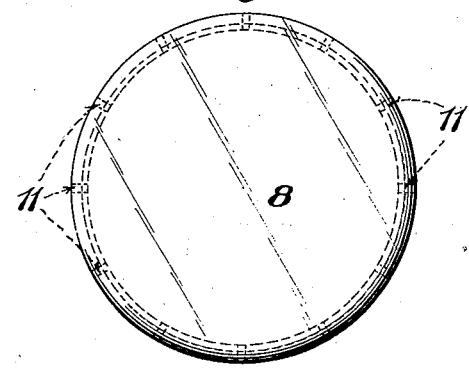
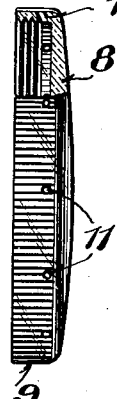
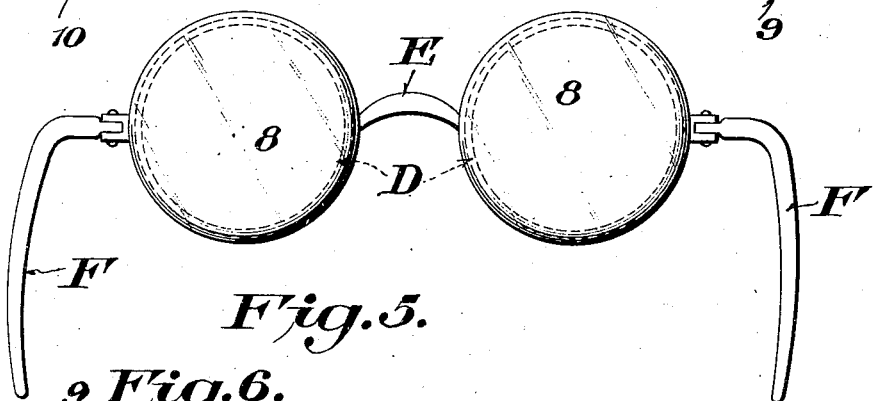
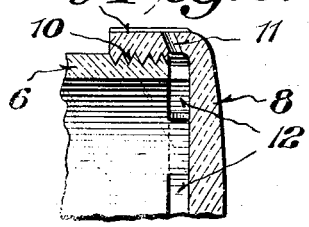
Inventor
Robert Malcom,
By Royal E. Burnham,
Attorney Patented Dec. 10, 1940

2,224,793

UNITED STATES PATENT OFFICE 2,224,793

OPHTHALMIC DEVICE

Robert Malcom, Chicago, Ill.

Application June 26, 1937, Serial No. 150,611

2 Claims. (Cl. 88—41)

It is an object of the invention to provide protective lenses that easily may be placed on a mounting and removed therefrom and replaced by others when those that have been in use become blurred or otherwise damaged and when it is desired to use lenses of different protective or optical characteristics.

Another object is so to form lenses as single pieces that they may be associated with and retained in place on goggle-cups and on rims of eyeglasses and spectacles without the use of parts other than the lenses and cups or rims themselves.

Further, it is an object to provide lens articles of this kind that may be produced with facility and economy from transparent cellulose or other initially plastic material.

Moreover, in view of the fact that the protective parts of ophthalmic devices formed in accordance with this invention each consists only of two parts—the lens entity and the holding rim—the cost of production of these devices is much less than those heretofore in use, and at the same time entirely satisfactory eye protection is afforded.

The invention also provides single-piece lenses that afford in association with the rims on which they are carried means for ventilating the rims or cups.

When considered with the description herein, characteristics of the invention are apparent in the accompanying drawing, forming part hereof, wherein adaptations are disclosed, for purposes of illustration.

Like reference-characters refer to corresponding parts in the views of the drawing, of which—

Fig. 1 is a view of a pair of goggles having lenses of the invention mounted thereon;

Fig. 2 is a section on the line 2—2, Fig. 1;

Fig. 3 is a front view of a lens;

Fig. 4 is a side view of a lens, partly in section;

Fig. 5 is a view of spectacles;

Fig. 6 is an enlarged fragmentary section of a lens and its mounting.

In Fig. 1, A designates a pair of goggles, B the eyecups thereof, and C a headband by which the goggles are held on the face. In Fig. 5, D designates lens rims, E the bridge, and F the temples of spectacles. The goggles and spectacles are shown as examples of ophthalmic devices with which the lens structure of the invention may be used.

An annular rim 6, as part of an eyecup, is shown in Fig. 2 as typical of a part on which the lens structure of the invention is mountable. Whether it be a rim of spectacles or eyeglasses or the annular end portion of a goggle-eyecup is immaterial. The rim has exterior peripheral threads 7.

The invention provides a lens 8, which may be plain, or of optical characteristics to correct the vision of the user; it may be clear, or it may be colored as protection against light. The inner surface of the lens is planar as shown.

The lens is formed with an integral rearwardly-disposed annular flange 9, which has an internal periphery corresponding to the external circumference of the threaded rim 6, and it has internal screw-threads 10 to engage the rim-threads.

When a lens is being put onto a rim, it is turned on until the planar inner surface of the lens proper contacts tightly against the edge of the rim, whereby it is reliably held in place.

The lens proper and its flange may be molded or pressed as a single integral unitary article out of glass, cellulose, or other suitable transparent material.

As seen in Figs. 4 and 6, the flange 9 may be formed between its threaded portion and the lens proper with vents 11 for ventilation.

For use with a lens so vented, the rim 6 is notched at its edge to afford passages 12, some or all of which register with the vents 11 when the lens is turned onto the rim, so that ventilation is afforded at the lens from the inside of the rim to the outside.

It is apparent, from the drawing and the foregoing description, that a lens such as disclosed may be produced economically in quantity; that it easily may be associated with and dissociated from rims of ophthalmic devices; that the rims themselves may be produced at small cost, and that the invention provides ophthalmic devices with which lenses of different protective and optical characteristics may be used at different times on the same rims.

What I claim as new, and desire to secure by Letters Patent is—

1. An ophthalmic device comprising an externally threaded circular rim having notches in its edge, and a lens structure comprising a lens proper, and integrally formed therewith an annular flange having internal threads adjacent to its free edge whereby said structure may be associated as a single entity with said rim, and said flange having also an unthreaded portion adjacent to the lens proper, there being ventilating vents extending through the unthreaded portion of said flange registrable with said rim notches.

2. An ophthalmic device comprising an externally threaded circular mounting rim having notches through its edge, and a lens structure comprising a lens proper having a planar surface at one side, and an annular flange formed integrally with said lens proper and extending rearwardly from its planar surface, said flange having internal threads adjacent to its free edge whereby said structure may be turned as a single entity onto said externally threaded rim to tight contact of its planar surface to the rim edge, and said flange also having an unthreaded portion adjacent to the lens proper, there being ventilating vents extending through the unthreaded portion of said flange registrable with said rim notches.

ROBERT MALCOM.